(12) United States Patent
Niezgorski et al.

(10) Patent No.: US 6,840,114 B2
(45) Date of Patent: Jan. 11, 2005

(54) HOUSING ON THE EXTERIOR OF A WELL CASING FOR OPTICAL FIBER SENSORS

(75) Inventors: Richard M. Niezgorski, Milldale, CT (US); Peter C. Ogle, Charlestown, RI (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/441,234

(22) Filed: May 19, 2003

(65) Prior Publication Data

US 2004/0231429 A1 Nov. 25, 2004

(51) Int. Cl.[7] .............................................. G01L 1/24
(52) U.S. Cl. ........................................................ 73/800
(58) Field of Search ..................... 73/152.01, 152.46, 73/152.48, 152.49, 152.59, 800, 152.47

(56) References Cited

U.S. PATENT DOCUMENTS

| | | | |
|---|---|---|---|
| 2,846,662 A | 8/1958 | Sparks | 340/15 |
| 4,360,272 A | 11/1982 | Schmadel et al. | 356/352 |
| 4,589,285 A | 5/1986 | Savit | 73/655 |
| 4,649,529 A | 3/1987 | Avicola | 367/149 |
| 4,745,293 A | 5/1988 | Christensen | 250/577 |
| 4,761,073 A | 8/1988 | Meltz et al. | 356/32 |
| 4,806,012 A | 2/1989 | Meltz et al. | 356/32 |
| 4,825,424 A | 4/1989 | Lamb et al. | 367/141 |
| 4,898,236 A | 2/1990 | Sask | 166/65.13 |
| 4,950,883 A | 8/1990 | Glenn | 250/227.14 |
| 4,996,419 A | 2/1991 | Morey | 250/227.18 |
| 5,051,965 A | 9/1991 | Poorman | 367/149 |
| 5,111,903 A | 5/1992 | Meynier | 181/102 |
| 5,163,321 A | 11/1992 | Perales | 73/151 |
| 5,308,973 A | 5/1994 | Odoni et al. | 250/227.17 |
| 5,317,383 A | 5/1994 | Berni | 356/351 |
| 5,319,435 A | 6/1994 | Melle et al. | 356/32 |
| 5,327,216 A | 7/1994 | Berni | 356/351 |
| 5,339,696 A | 8/1994 | Carignan | 73/862.041 |

(List continued on next page.)

FOREIGN PATENT DOCUMENTS

WO       WO 85/03105        7/1985        ........... E21B/47/06

OTHER PUBLICATIONS

Huang, M.; Jiang, L.; Liaw, P.K.; Brooks, C.R.; Seeley, R.; and Klarstrom, D.L., "Using Acoustic Emission in Fatigue and Fracture Materials Research", *JOM–e: The Member Journal of the Minerals, Metals & Materials Society, free electronic supplement,* [online], Nov. 1998 [retrieved on Aug. 22, 2002]. Retrieved from the Internet:<URL: http://www.tms.org/pubs/journal/JOM/9811/Huang/Huang–9811.html>.

Nikulin, S.A.; Khanzhin, V.G.; and Rojnov, A.B., "Application of Acoustic Emission Method for Materials, Processes and Technologies Monitoring", *Proceedings of the 15th World Conference on Nondestructive Testing, Roma (Italy),* 15–21 [online], Oct. 2000 [retrieved on Aug. 22, 2002]. Retrieved from the Internet: <URL: http:www.ndt-.net/article/wendt00/papers/idn792/idn792.htm>.

(List continued on next page.)

*Primary Examiner*—Max Noori
(74) *Attorney, Agent, or Firm*—Moser, Patterson & Sheridan, L.L.P.

(57) ABSTRACT

Improved methods and apparatuses for directly monitoring well casing strain and structural integrity are disclosed that allows for monitoring of potentially damaging strain from any orientation or mode and over long stretches of well casing. In a preferred embodiment, optical fiber sensors are housed within a housing and attached to the exterior surface of the casing. The sensors may be aligned parallel, perpendicular, or at an appropriate angle to the axis of the casing to detect axial, hoop, and shear stresses respectively. The sensors are preferably interferometrically interrogatable and are capable of measuring both static and dynamic strains such as those emitted from microfractures in the well casing.

17 Claims, 6 Drawing Sheets

U.S. PATENT DOCUMENTS

| | | | | |
|---|---|---|---|---|
| 5,353,637 A | 10/1994 | Plumb et al. | ............... | 73/151 |
| 5,361,130 A | 11/1994 | Kersey et al. | ............... | 356/345 |
| 5,380,995 A | 1/1995 | Udd et al. | ............. | 250/227.18 |
| 5,397,891 A | 3/1995 | Udd et al. | ............. | 250/227.18 |
| 5,401,956 A | 3/1995 | Dunphy et al. | ........ | 250/227.18 |
| 5,426,297 A | 6/1995 | Dunphy et al. | ........ | 250/227.23 |
| 5,444,803 A | 8/1995 | Kim et al. | .................. | 385/28 |
| 5,451,772 A | 9/1995 | Narendran | ............. | 250/227.19 |
| 5,452,087 A | 9/1995 | Taylor et al. | ............... | 356/352 |
| 5,493,113 A | 2/1996 | Dunphy et al. | ........ | 250/227.19 |
| 5,493,390 A | 2/1996 | Varasi et al. | .................. | 356/32 |
| 5,495,892 A | 3/1996 | Carisella | .................... | 166/387 |
| 5,497,233 A | 3/1996 | Meyer | ...................... | 356/345 |
| 5,507,341 A | 4/1996 | Eslinger et al. | ............. | 166/187 |
| 5,513,913 A | 5/1996 | Ball et al. | .................. | 374/120 |
| 5,529,346 A | 6/1996 | Sperring | .................... | 285/93 |
| 5,564,504 A | 10/1996 | Carisella | .................... | 166/387 |
| 5,675,674 A | 10/1997 | Weis | ......................... | 385/12 |
| 5,680,489 A | 10/1997 | Kersey | ...................... | 385/12 |
| 5,767,411 A | 6/1998 | Maron | ........................ | 73/705 |
| 5,789,669 A | 8/1998 | Flaum | ..................... | 73/152.51 |
| 5,804,713 A | 9/1998 | Kluth | ..................... | 73/152.01 |
| 5,892,860 A | 4/1999 | Maron et al. | .................. | 385/12 |
| 5,925,879 A | 7/1999 | Hay | ...................... | 250/227.14 |
| 5,987,197 A | 11/1999 | Kersey | ........................ | 385/24 |
| 6,016,702 A | 1/2000 | Maron | ........................ | 73/705 |
| 6,072,567 A | 6/2000 | Sapack | ...................... | 356/32 |
| 6,175,108 B1 | 1/2001 | Jones et al. | ............. | 250/227.14 |
| 6,354,147 B1 | 3/2002 | Gysling et al. | ............ | 73/61.79 |
| 6,384,404 B1 * | 5/2002 | Berg | ...................... | 250/227.16 |
| 6,601,671 B1 * | 8/2003 | Zhao et al. | .................. | 181/108 |
| 6,625,376 B2 * | 9/2003 | Werkheiser et al. | ........ | 385/139 |

OTHER PUBLICATIONS

Boccheri, R.T., "Acoustic Emission Testing of Unidirectional Composite Coupons: Experimental Methods and Data Analysis", [online], [retrieved on Aug. 22, 2002]. Retrieved from the web site of Applied Research Associates, Inc. using the Internet <URL: http://www.arasvo.com/AE.htm>.

"Laboratory Acoustic Emission and Ultrasonic Testing of Brittle Materials" [online], [retrieved on Aug. 22, 2002]. Retrieved from the web site of MTS Systems Corporation using the Internet <URL: http://www.mts.com/techpapers/pdf/100–059–018%20Acoustic%20EEmissi.pdf>.

Sypeck, D.J. "Damage Evaluation in Titanium Matrix Composites", *Ph.D. Dissertation,* University of Virginia, 1996 [online], [retrieved on Aug. 22, 2002]. Retrieved from the Internet: <URL: http://ginsburg.ipm.virginia.edu/process/Cons/Pubs/thesis19/chapter3.pdf>Chapter 3, pp. 35–47.

Sypeck, D.J. "Damage Evaluation in Titanium Matrix Composites", *Ph.D. Dissertation,* University of Virginia, 1996 [online], [retrieved on Aug. 22, 2002]. Retrieved from the Internet: <URL: http://ginsburg.ipm.virginia.edu/process/Cons/Pubs/thesis19/chapter9.pdf>Chapter 9, pp. 119–120.

Morey, W.W.; Meltz, G.; and Weiss, J.M., "High Temperature Capabilities and Limitations of Fiber Grating Sensors", *Proceedings of the SPIE, Tenth International Conference on Optical Fibre Sensors,* vol. 2360 (Oct. 11, 1994), pp. 234–237.

Xu, M.G.; Geiger, H.; and Dakin, J.P., "Fiber Grating Pressure Sensor with Enhanced Sensitivity Using a Glass–Bubble Housing", *Electronics Letters,* vol. 32, No. 2 (Jan. 18, 1996), pp. 128–129.

Gai, H., et al., "Monitoring and Analysis of ECP Inflation Status Memory Gauge Date", SPE #36949 (Oct. 22, 1996), pp. 679–685.

U.S. patent application Ser. No. 09/612,775, entitled "Method and Apparatus for Seismically Surveying an Earth Formation in Relation to a Borehole", filed Jul. 10, 2000.

* cited by examiner

HOUSING ON THE EXTERIOR OF A WELL CASING FOR OPTICAL FIBER SENSORS

CROSS REFERENCE TO RELATED APPLICATIONS

This application contains subject matter similar to that disclosed in Ser. No. 10/441,233 filed May 14, 2003, entitled "Well Casing Integrity Monitoring System," which is filed concurrently herewith, and which is incorporated herein by reference in its entirety.

FIELD OF THE INVENTION

This invention generally relates to monitoring the structural integrity and stress on a conduit, and more particularly, to monitoring the structural integrity and stress on a well casing used in oil drilling operations.

BACKGROUND OF THE INVENTION

Oil and gas production from petroleum reservoirs results in changes in the subsurface formation stress field. These changes, when large enough, can result in serious damage or even complete loss of the bore hole through major deformation of the well casing. Thus, it is desirable to monitor subsurface stress fields as they may indirectly indicate the stress experienced by a well casing during oil production. While monitoring subsurface stress fields may generally be useful in determining the stress, or strain, experienced by a well casing, direct detection of casing strain is expected to give a better understanding of the subsurface forces that lead to deformation of the well casing and would allow for more precise monitoring of well casing integrity. This will lead to development of both preventative operating measures, including early abandonment in advance or dangerous well conditions and casing deformation, as well as better casing design and improved well completion programs. Consequently, oil companies have expressed an interest in direct monitoring of strain in the casing during the life of the well.

Direct monitoring of strain on a well casing, however, is often problematic because well casing strain can be caused by a number of different stresses or modes, including tensile or compressive stresses imparted along the axis of the casing, and shear stresses imparted through twisting or forces perpendicular to the casing axis. Casing strain can occur over long stretches of casing or can be very localized, and therefore may go undetected. The high magnitudes of strain that can cause deformation of a well casing, and/or the harsh environment down hole, can also cause apparatuses traditionally used to monitor strain to cease functioning.

Methods and apparatuses currently used to monitor well casing strain do not provide a solution to problems associated with direct strain monitoring. Many prior art techniques for monitoring well casing strain involve the use conventional strain gauges or sensors of the kind that are only capable of measuring strain in one orientation or mode at any given time. Conventional strain gauges are also prone to malfunctioning and damage when subjected to the high strain levels of interest and to the harsh environment of oil wells, and may not allow for direct monitoring of casing strain. Accordingly, conventional well casing strain monitoring methods and apparatuses can fail to detect critical points of high strain in a well casing that can lead to casing deformation, or may not detect strain at isolated critical locations on a casing. Precise monitoring of well casing strain is therefore difficult with the use of conventional methods and apparatuses.

It is known in the prior art that optical fiber sensors can be useful for measuring various stresses and temperatures present in the down hole environment. In U.S. patent application Ser. No. 09/612,775, entitled "Method and Apparatus for Seismically Surveying an Earth Formation in Relation to a Borehole," filed Jul. 10, 2000, which is incorporated herein by reference, a technique is disclosed for using optical fiber sensors to detect seismic events, and in one embodiment it is contemplated that such sensors can be coupled to the well casing to detect seismic emissions emanating from the surrounding earth strata. However, this configuration is not suited to measure casing strain per se, as it is configured and attached to firmly couple to the surrounding borehole. Accordingly, the sensors disclosed in that application will naturally pick up acoustics such as seismic signals present in the surrounding earth strata, reducing their ability to measure casing strains without interference.

Thus, there is a need for a monitoring system for detecting well casing strain that allows for detection of strain from any orientation or mode before excess casing deformation occurs, that allows for distributed strain sensing capability over very long lengths of a well casing, and that does not suffer from the foregoing shortcomings of the prior art. There is also a need for protecting such sensors. The present disclosure provides such a method and apparatus.

SUMMARY OF THE INVENTION

Improved methods and apparatuses for directly monitoring well casing strain and structural integrity are disclosed that allows for monitoring of potentially damaging strain from any orientation or mode and over long stretches of well casing. In a preferred embodiment, optical fiber sensors are housed within a housing and attached to the exterior surface of the casing. The sensors may be aligned parallel, perpendicular, or at an appropriate angle to the axis of the casing to detect axial, hoop, and shear stresses respectively. The sensors are preferably interferometrically interrogatable and are capable of measuring both static and dynamic strains such as those emitted from microfractures in the well casing.

BRIEF DESCRIPTION OF THE DRAWINGS

The foregoing and other features and aspects of the present disclosure will be best understood with reference to the following detailed description of specific embodiments of the invention, when read in conjunction with the accompanying drawings, wherein.

DETAILED DESCRIPTION OF EMBODIMENTS OF THE INVENTION

In the disclosure that follows, in the interest of clarity, not all features of an actual implementation of a well casing integrity monitoring system are described in this disclosure. It will of course be appreciated that in the development of any such actual implementation of the disclosed invention, as in any such project, numerous engineering and design decisions must be made to achieve the developers' specific goals, e.g., compliance with mechanical and business related constraints, which will vary from one implementation to another. While attention must necessarily be paid to proper engineering and design practices for the environment in question, it should be appreciated that development of a well casing integrity monitoring system would nevertheless be a routine undertaking for those of skill in the art given the details provided by this disclosure, even if such development efforts are complex and time-consuming.

The disclosed embodiments are useful in directly monitoring well casing strain, and particularly when then the strain reaches a level that can threaten the structural integrity of the well casing. The disclosed embodiments preferably use optical fiber sensors, which provide a large number of options for measuring the strain imposed on a well casing and which offer high reliability. Fiber optic sensors also have the additional benefit that they can be easily multiplexed along a single fiber optic cable (using time division multiplexing or wavelength division multiplexing as is well known) to allow for several sensors to be connected in series, or to be connected to other optical sensors that measure parameters other than casing strain. However, other types of strain-measuring sensors can be used if desired, such as electrical, piezoelectric, capacitive, accelerometers, etc.

It is believed that the magnitude of well casing strain of interest to detect is between about 0.01% and 10.0%, which is believed to equate to stresses ranging from about 3000 pounds per square inch (psi) to well above the yield strength for a standard steel casing. At a 10% axial strain (i.e., parallel to the casing axis), the casing would be expected to undergo significant plastic deformation and possible catastrophic failure. The disclosed fiber optic sensors, which are preferably made of optical fiber having a cladding diameter of from about 80 to 125 microns, can be subject to about 100,000 psi (i.e., 1% strain) along its length without serious risk of breaking, and hence will be able to detect high strains and potential problems up to at least the onset of plastic deformation of steel casings. Therefore, it is theorized that the disclosed fiber optic sensors can be used to detect strains in the casing of between 0.01% and 1.0%, which covers a large portion of the detectable range of interest, and possibly higher ranges when detecting shear stresses which are not aligned with the optical fiber.

FIGS. 1 to 4 disclose preferred embodiments of optical fiber sensors for directly monitoring well casing strain by either measuring static strain or by measuring dynamic acoustic emissions coming from microfractures occurring in the metal structure of the well casing. More specifically, these Figures show a segment of well casing 1 embedded in casing cement 4, which is further embedded in subsurface formation 3. A production tube 2, through which oil flows during production, is located inside of well casing 1. An optical fiber 8 extends alongside well casing 1 and is enclosed by protective cable 5 throughout its length. Cable 5 is preferably comprises a ¼ inch diameter metal tube for housing the fiber optic cable that forms or is spliced or coupled to the fiber optic sensor disclosed herein. The cable 5 is preferably banded or clamped to the outside of the casing at various points along its length. The length of optical fiber 8 that is attached to the exterior surface of well casing 1 to form the sensor(s) is covered by a sensor housing 9. The housing can be similar in construction to that disclosed in U.S. Pat. No. 6,435,030, which discloses a housing for sensors coupled to the production tube, and which is incorporated by reference in its entirety.

The use of a housing 9 to protect the sensors outside of the casing constitutes a novel advance over the prior art disclosed in aforementioned incorporated U.S. patent application Ser. No. 09/612,775 and U.S. Pat. No. 6,435,030. The '030 patent does not disclose the use of a housing for sensors deployed on the casing. In the '775 application, fiber optic sensors attached to the casing are not confined within a rigid housing because the goal of that application is to acoustically couple the sensors to the subsurface formation to efficiently detect seismic events. However, in the present application, it is desirable to isolate the sensors from acoustics or stresses in the subsurface formation as much as possible so that the strains and acoustics in the casing are measured with minimal interference. The housing 9 helps to effectuate this goal. Sensor housing 9 is preferably welded to the exterior surface of well casing 1, and covers the entire length of optical fiber 8 that is attached to well casing 1. Sensor housing 9 is further preferably vacuumed or filled with an inert gas such as nitrogen to form an acoustically insulative gap between the housing and the sensors (which is helpful even though external borehole noise could to some extent couple through other portions of the casing 1 to the sensors). The housing 9 and cable 5 are preferably affixed to the casing before it is deployed down hole, and before application of the casing cement.

Optical fiber 8 could be a standard communications fiber, although environmental considerations may dictate the use of fibers that are for instance not sensitive to hydrogen which is often present in the well fluid. As will be explained in further detail, fiber 8 is preferably formed into or spliced to coils 7 which are each bounded by a pair of fiber Bragg gratings (FBGs) 6 to form the casing strain sensors. The use of FBGs in fiber optic sensors is well known in the art, and the reader is referred to U.S. Pat. Nos. 5,767,411, 5,892,860, 5,986,749, 6,072,567, 6,233,374, and 6,354,147, all of which are incorporated herein by reference, to better understand such applications. Each coil 7, when unwound, is preferably from approximately 10 to 100 meters in length. Coils 7 are preferably attached to the exterior surface of well casing 1 with the use of an epoxy or an adhesive film. More specifically, an epoxy film is first adhered to the exterior surface of well casing 1, and the coils 7 are placed on top of the epoxy film. The epoxy film may then be cured, or heated, to rigidly bond optical fiber to the exterior surface of well casing 1. When affixing the fiber to the casing, it may be preferable to place the fiber under some amount of tension. In this way, compression of the casing may be more easily detected by assessment of the relaxation of the tensile stress on the fiber 8.

Figure 5:
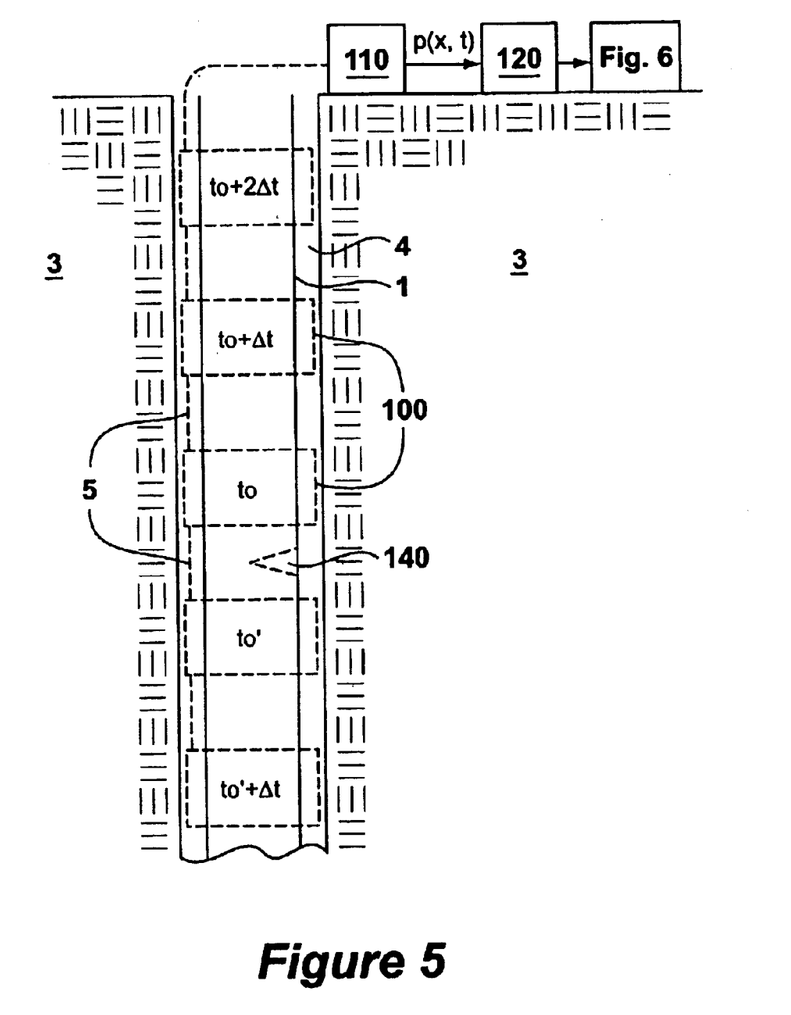
FIG. 5 depicts a casing sensor array comprising a number of sensor stations incorporating the sensors configurations of FIGS. 1–4, and related optical source/detection and signal processing equipment.

In a preferred embodiment, sensor coils 7 are attached at more than one depth on the well casing 1 (see FIG. 5). In this regard, and as is well known, several sensor regions such as that depicted in FIG. 1 may be multiplexed along a common fiber optic cable 8 at various depths on the casing. Depending on the types of fiber Bragg gratings used (which will be explained later), and the sensor architecture, the sensors may be, for example, time division multiplexed (TDM) or wavelength division multiplexed (WDM), as is well known to those of skill in the art.

Figure 1:
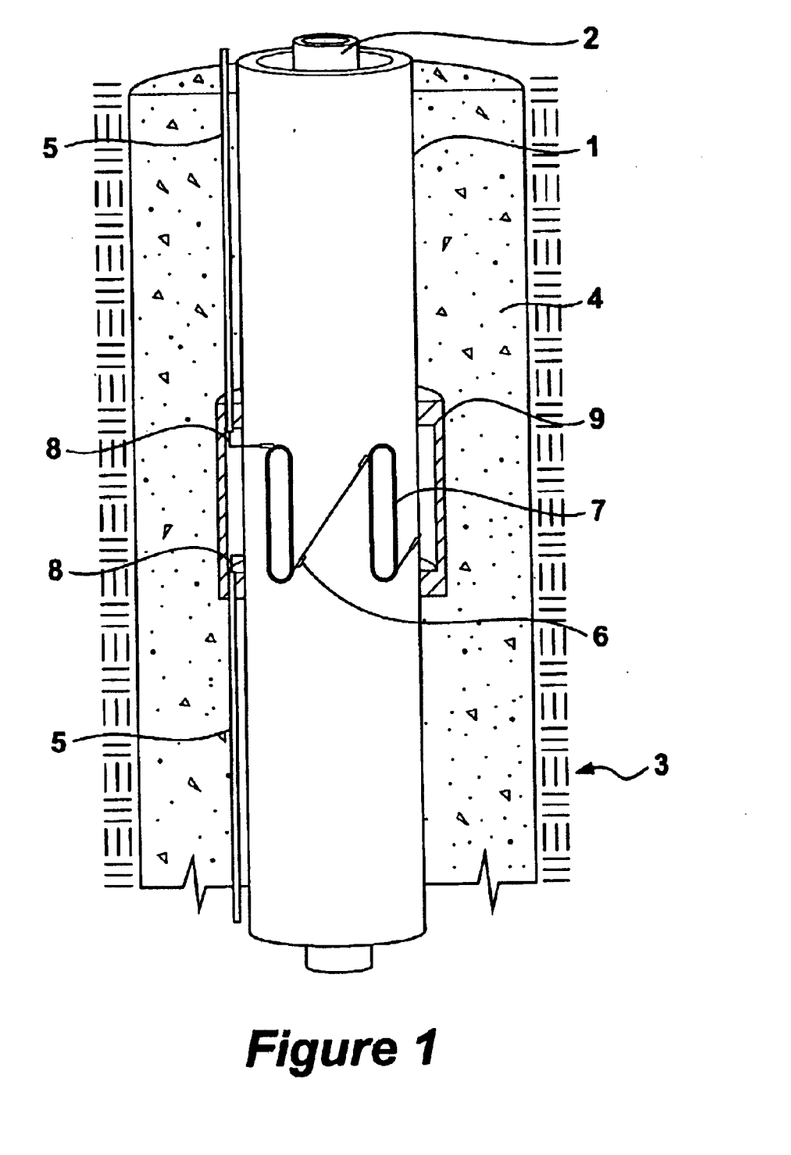
FIG. 1 depicts an embodiment of the present invention wherein an array of four axially-aligned optical fiber sensors are oriented at 90° around an exterior surface of a well casing.
Figure 2:
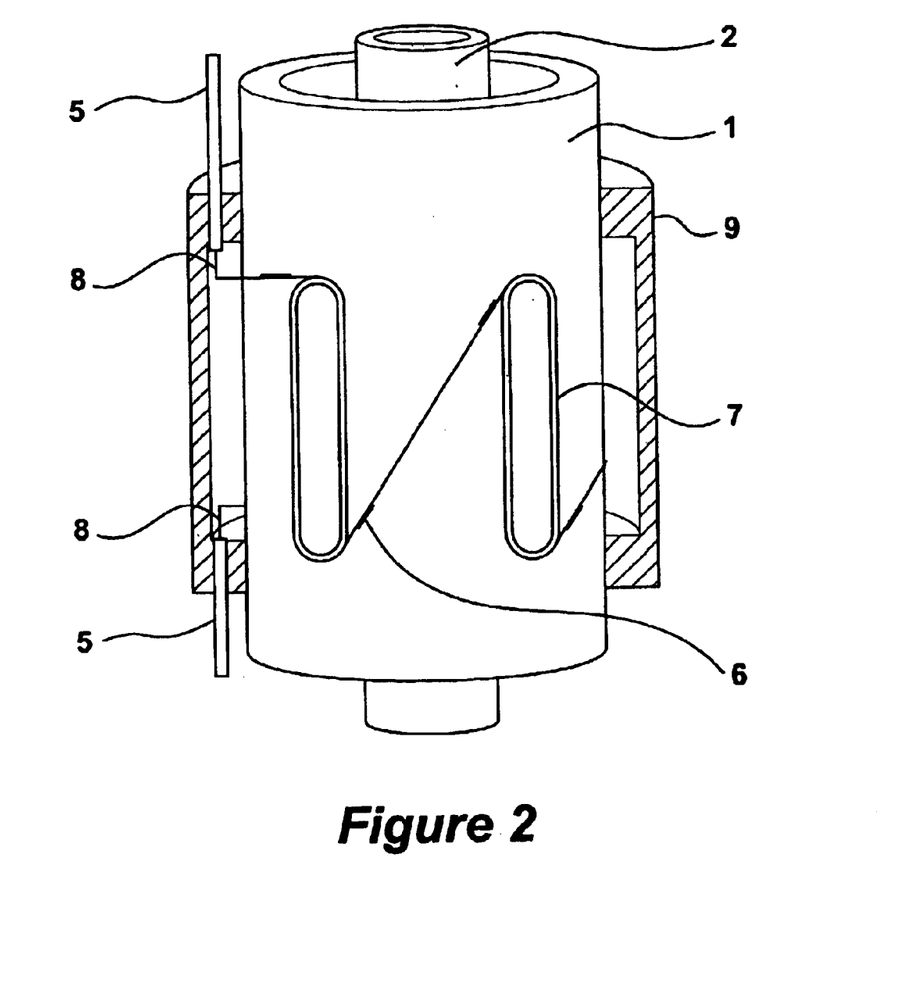
FIG. 2 depicts an exploded view of the sensor arrangement shown in FIG. 2.
Figure 3:
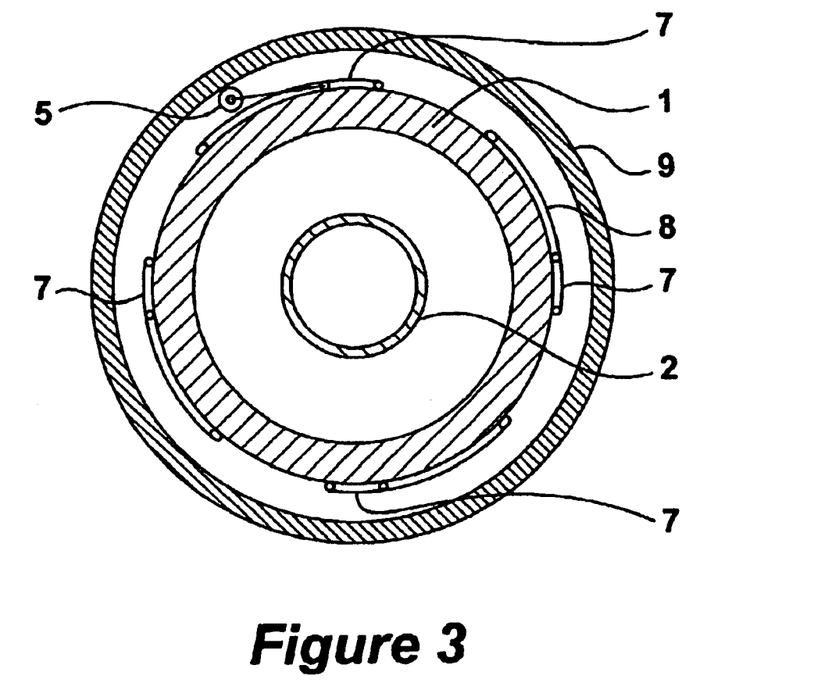
FIG. 3 depicts a cross sectional view of the sensor arrangement shown in FIG. 1 taken perpendicularly to the axis of the casing.

In the embodiment of FIGS. 1–3, the coils 7 are elongated in a direction parallel to the axis, which makes them particularly sensitive to axial strains in the casing 1. When the casing is axially strained, the overall length of the coils 7 are changed accordingly. This change in length of the coil 7 can be determined by assessing the time it takes light to travel through the coil, which is preferably determined by interferometric means. Such optical detection schemes are well known, and are disclosed for example in U.S. patent application Ser. No. 09/726,059, entitled "Method and Apparatus for Interrogating Fiber Optic Sensors," filed Nov. 29, 2000, or U.S. Pat. Nos. 5,767,411 or 6,354,147, which are incorporated herein by reference.

It is preferable that each coil 7 be bounded by a pair of FBGs 6, such that each coil's pair has a unique Bragg reflection wavelength. It is further preferable to isolate the FBGs 6 from casing strain, because without such isolation the reflection (Bragg) wavelength of the FBGs might excessively shift, which would make their detection difficult and hence compromise sensor function. In this regard, it can be useful to place an isolation pad between the FBGs 6 and the outside surface of the casing, similar to the method disclosed in U.S. Pat. No. 6,501,067, issued Dec. 31, 2002, and which is incorporated by reference in its entirety. When so configured, the coils may be multiplexed together using a wavelength division multiplexing approach. Alternatively, each coil 7 can be separated by a single FBG 6 (not shown), wherein each separating FBG has the same Bragg reflection wavelength in a time division multiplexing approach, such as is disclosed in U.S. Pat. No. 6,354,147. One skilled in the art will realize that the FBGs 6 can be fusion spliced to the coils 7 and to the fiber 8, which is preferable to reduce signal attenuation as it passes through the various coils. As the details of fusion splicing are well known, they are not repeated here. The length of the coils 7 along the axis of the casing can be easily changed, e.g., up to tens of meters, which allows for static strains along this length to be averaged, which might be suitable in some applications. If a very long strain length measurement is desired, it may not even be necessary to form a coil, and instead sensor 7 can constitute a straight line of fiber optic cable affixed to the exterior of the casing. However, care should be taken to adjust the length of the sensor, be it coiled or uncoiled, so that interferometric detection is possible if an interferometric interrogation scheme is used.

The coils 7 of FIGS. 1–3 are preferably spaced at equal intervals around the outside diameter of the casing, e.g., at 90 degrees when four coils 7 are used. In this manner, the location or distribution of the stress on the casing can be deduced. For example, if the casing is stressed by bending to the right, the coil 7 on the right side might be seen to have compressed (or its relative degree of tensile stress relaxed) while the coil 7 on the left side might be seen to be relatively elongated by tension. Of course, more or fewer than four coils 7 could be used.

In an alternative embodiment, the FBGs 6 themselves, as opposed to the coils 7, may act as the sensors. In this embodiment (not shown), the FBGs 6 would themselves be attached to the casing at the position of the coils, and would be oriented parallel to the axis of the casing. Axial deformation of the casing will stretch or compress the FBGs 6, and the amount of deformation can be determined by assessing the shift in the Bragg reflection wavelength of the FBGs, as is well known. If such an alternative approach is used, it would be preferable that each FBG have a unique Bragg reflection wavelength to allow proper resolution of one FBG from another, i.e., in a wavelength division multiplexing approach. The FBGs 6 in this approach can be serpentined around the casing 1, in a manner similar to that disclosed in U.S. Pat. No. 6,354,147 in order to measure shear strain.

Figure 4:
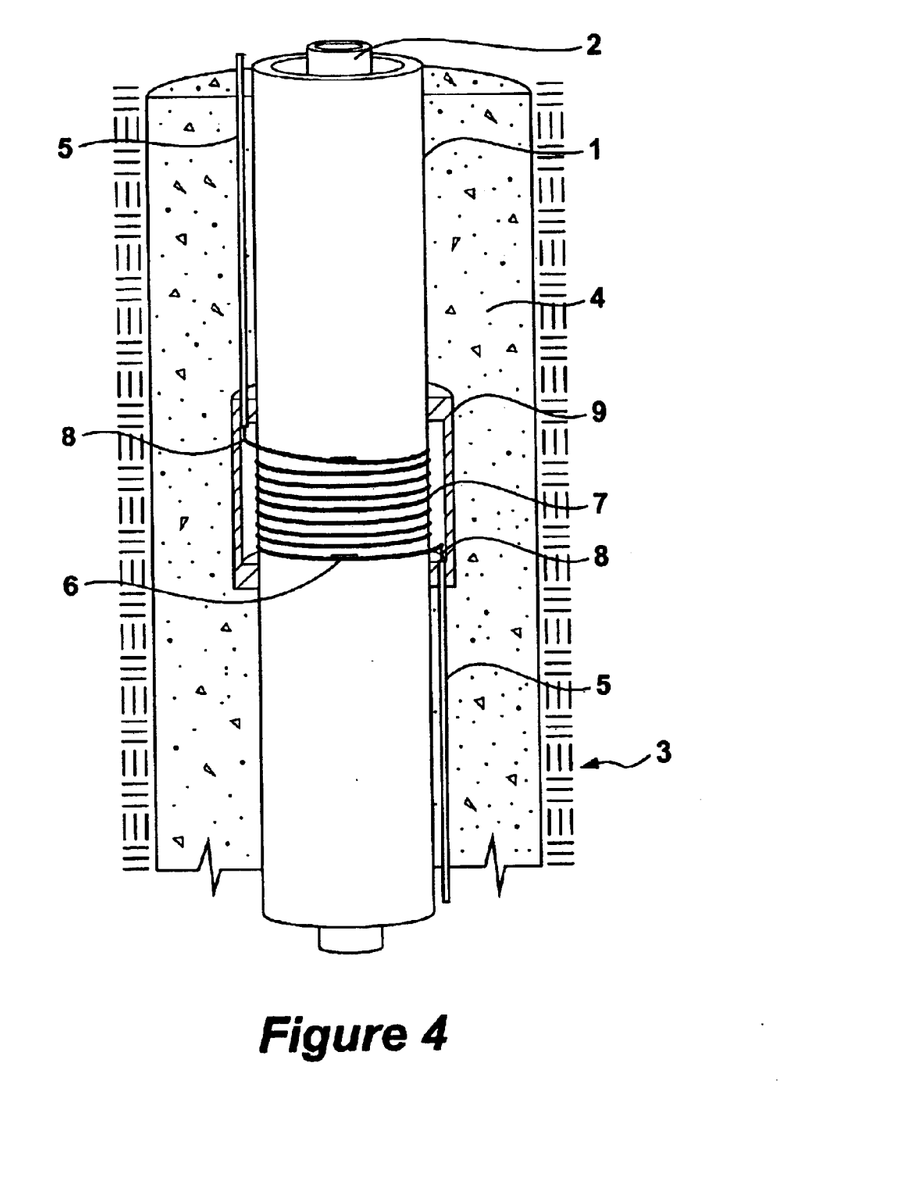
FIG. 4 depicts an embodiment of the present invention wherein an optical fiber sensor is wrapped circumferentially around the casing to detect hoop stresses perpendicular to the axis of the casing.

FIG. 4 shows an orientation of a fiber optic sensor for measuring hoop strain in the casing. In FIG. 4, the coil 7 is wrapped around and affixed to the circumference of the casing 1, and again is bounded by a pair of FBGs 6. So oriented, the coil 7, will elongate or compress when the casing is subject to a hoop strain. If desirable, the coil 7 in this embodiment may be coiled at an angle around the casing, or may constitute a helical structure, which would be preferred for shear strains.

To measure all potential stress modes on the casing 1, one skilled in the art will note that a combination of axially (FIGS. 1–3), circumferentially, and angled sensors can be used, and can be housed within a common housing 9 to form an all-inclusive strain sensor station.

The manner in which the disclosed sensors, assisted by its protective housing 9, may be used to detect static strains in the casing is obvious from the foregoing descriptions. However, an additionally useful benefit comes from the ability of the disclosed sensors to detect dynamic strains in the casing, namely, those acoustics emitted from microfractures that occurs within the casing when it is placed under relatively high strains. Microfracture acoustics will generally be very sharp in duration and of relatively high frequency content, e.g., in the 10 kilohertz to 1 megahertz range. This allows such acoustics to be easily resolved when compared to other acoustics that are present downhole, such as acoustics present in the fluid being produced through the production pipe 2. These microfracture-based acoustics are likely to occur under all modes of casing loading, but with different characteristic signatures of amplitude, frequency content and rate of acoustic events. The relatively low energy release of these acoustic emissions preferably requires a strain sensor that is highly sensitive, such as the interferometric sensor arrangements disclosed above.

When detecting microfracture acoustics, axial orientation of coils 7 (FIGS. 1–3) is preferred because acoustic emissions generally propagate axially along the length of well casing 1. When detecting these dynamic emissions, coils 7 are preferably attached to well casing 1 at a distance away from known zones of high subsurface formation stress if possible so that acoustics can be detected (as they move through the casing) without directly exposing the sensors to the stress. With this offset location, the sensor will be capable of detecting casing strains up to at least 10 percent strain. The sensors, e.g., coils 7, are adjusted in length to be sensitive to the frequencies and amplitude characteristic of acoustic emissions caused by microfractures in well casing 1, which may require some experimentation for a given application within the purview of one skilled in the art.

As mentioned earlier, acoustic emissions from metal structures, such as well casing 1, are distinct events that normally have a characteristic high frequency content of between about 10 kilohertz to 1 megahertz. This makes detection of these dynamic events relatively simple. First, monitoring of this frequency range would normally only be indicative of microfractures, and not other acoustics naturally present down hole. Second, that these relatively high frequency events are time limited in duration helps to further verify that microfractures in the casing are being detected. Third, as the acoustics emitted from the microfractures will travel along the casing 1, their origin can be pinpointed. The housing 9 around the sensors adds to the sensitivity, because it not only protects the sensors, but also helps to reduce the influence of noise from outside the bore hole from being detected, as mentioned earlier. These points are clarified in subsequent paragraphs.

FIG. 5 shows a system incorporating several casing monitoring sensor stations 100 deployed down hole to form a sensor array. Each station 100 comprises the sensor embodiments disclosed in FIGS. 1–3 or 4 (or both) and can be multiplexed together along a common fiber optic cable housed in cable 5 as described above. The spacing between the sensor stations 100 can vary to achieve the desired resolution along the casing, and preferably can range from 50 to 1000 feet in length. The array is coupled to optical source/detection equipment 110 which usually resides at the surface of the well. Such equipment 110 is well known and not explained further.

Figure 6:
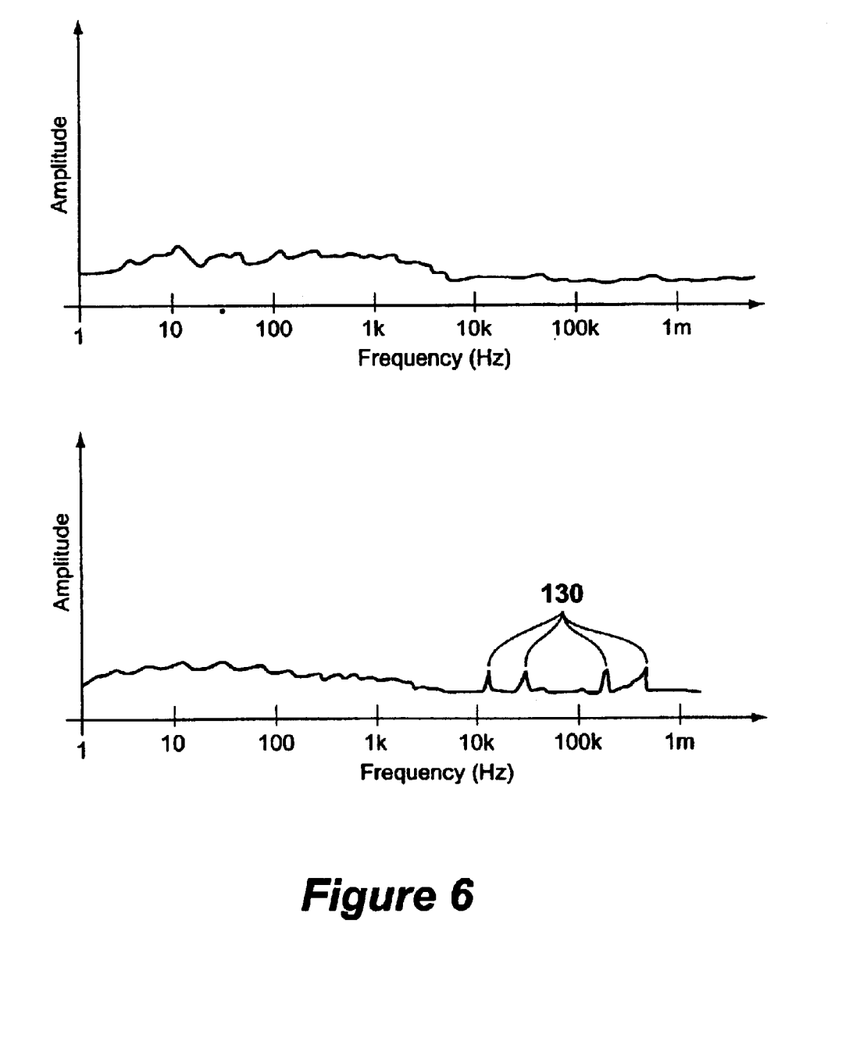
FIG. 6 depicts frequency spectra detectable by the disclosed sensors for a casing without microfracture stresses (top) and with microfracture stresses (bottom).

The electronics in equipment 110 convert the reflected signals from the various sensors into data constructs indicative of the acoustic strain waves propagating in the casing and straining the sensors as a function of time, again as is well known, and this data is transferred to a signal analysis device 120. The signal analysis device 120 converts the strain data into a frequency spectrum, represented in FIG. 6. As one skilled in the art will understand, the frequency spectra of FIG. 6 are generated and updated at various times for each sensor in each sensor station 100 in accordance with a sampling rate at which the sensors are interrogated. For example, each frequency spectra may be generated and/or updated every 0.05 to 1.0 seconds, or at whatever rate would be necessary to "see" the acoustics emitted from the microfractures, which as noted above are time-limited events. When dynamic stresses caused by microfractures in the casing are not present, and referring to the top spectrum of FIG. 6, significant acoustics will not be seen in the 10 kHz to 1 MHz range of interest, although some amount of baseline acoustics may be seen in this range. When microfractures in the casing are present, peaks 130 will be seen in this range of interest, indicative of the acoustics emitted by these microfractures. Such peaks 130 can be detected and processed either manually (e.g., visually) or through algorithmic data analysis means.

Because the conversion of the strain induced acoustic data from the sensors into its constituent frequency components is well known to those in the signal processing arts, this conversion process is only briefly described. As is known, and assuming a suitably high optical pulse (sampling) rate, the reflected signals from the sensors in the sensor stations 100 will initially constitute data reflective of the acoustic strain waves presented to the sensor as a function of time. This acoustic strain wave versus time data is then transformed by the signal analysis device 120 to provide, for some sampled period, a spectrum of amplitude versus frequency, as is shown in FIG. 6. As is well known, this can be achieved through the use of a Fourier transform, although other transforms, and particularly those applicable to processing of discrete or digitized data constructs, may also be used. While the disclosed sensors can detect frequencies up to 1 MHz, and hence should be suitable to detect microfractures in the casing, one skilled in the art will recognize that suitably short sampling periods may be necessary to resolve a particular frequency range of interest. If necessary, the signal analysis device 120 could contain a high pass filter to filter out lower frequencies not of particular interest to the detection of microfracture acoustics.

Further confirmation of the detection of microfracture induced acoustic emissions is possible due to the fact that such noise will travel with relatively good efficiency through the casing 1, and in this regard it is believed that such emission can travel for hundreds of meters through the casing without unacceptable levels of attenuation for detection. For example, suppose the casing experiences strain at time t=0 at location 140, thereby generating microfracture-induced acoustics. These acoustics will travel though the casing until it reaches the sensor station 100 above it (e.g., at time $t=t_0$) and below it (at time $t=t_0'$), where $t_0$ and $t_0'$ will vary depending on whether location 140 is closer to the top or bottom station, and will vary in accordance with the speed of sound within the casing. At those times, the acoustics are detected at each of these two stations pursuant to the frequency analysis technique disclosed above. If not significantly attenuated, the acoustics will then propagate to the next sensor stations. Assuming the acoustics propagate between the stations 100 at a time of $\Delta t$, they will be seen at the next stations at times $t=t_0+\Delta t$ and $t=t_0'+\Delta t$, and so on. Accordingly, by assessing the time of arrival of the acoustics at each station, the location of the strain that is generating the microfracture acoustics, i.e., at location 140, can be determined, which might allow for inspection of this location or other corrective action. This assessment can be made before or after converting the time-based acoustic signals to frequency spectra. If time based-acoustic signals are used, well known cross correlation techniques, such as those disclosed in U.S. Pat. No. 6,354,147, can be used to compare the signals at each of the stations and to compare them to understand the relative differences in time that the acoustics arrive at each of the sensor stations.

When detecting dynamics strains such as those emitted by microfractures in the casing, the sensing elements may comprise accelerometers, such as piezoelectric accelerometers capable of detecting the frequencies of interest. In this regard, it should be noted that although the use of fiber optic sensors are preferred in conjunction with the disclosed technique, the use of such sensors is not strictly required.

As fiber optic sensors generally, and specifically the fiber optic sensors disclosed herein, are sensitive to temperature, one skilled in the art will recognize that temperature compensation schemes are preferably necessary in conjunction with the disclosed techniques and apparatuses. Such compensation can be necessary to distinguish whether sensor deformation results from stress (e.g., from compression or tension of the sensors) or from temperature (e.g., from thermal expansion of the lengths of the sensors). For example, an FBG isolated from the casing (and other) strains, e.g., can be used to detect the temperature so that the disclosed sensors can be compensated for to understand only the pressures impingent upon them. As such temperature compensation schemes for fiber optic sensors are well known, and can constitute a myriad of forms, they are not disclosed further.

It is contemplated that various substitutions, alterations, and/or modifications may be made to the disclosed embodiment without departing from the spirit and scope of the invention as defined in the appended claims and equivalents thereof.

What is claimed is:

1. A system for measuring strain on a casing deployed down a well, wherein the casing is concentric about a central axis, comprising:

at least one optical fiber sensor coupled to an exterior circumference of the casing that senses a casing strain along a sensing section; and a housing affixed to the exterior of the casing, wherein the housing forms a closed cavity on the outside of the casing along the sensing section with the at least one optical fiber sensor enclosed therein, thereby isolating the sensing section from an outside environment.

2. The system of claim 1, wherein the housing contains a gap between the sensor and the housing.

3. The system of claim 1, wherein the optical fiber sensor comprises a coil of optical fiber.

4. The system of claim 3, wherein the coil is bounded by a pair of fiber Bragg gratings.

5. The system of claim 3, wherein the coil is elongated along a line parallel to the central axis of the casing.

6. The system of claim 3, wherein the coil comprises a helix around the central axis of the casing.

7. The system of claim 3, wherein the coil is wrapped around the exterior circumference and concentric with the central axis of the casing.

8. The system of claim 1, wherein the optical fiber sensor comprises a fiber Bragg grating.

9. The system of claim 1, wherein the housing is either filled with a gas or evacuated.

10. The system of claim 1, wherein the system comprises a plurality of optical fiber sensors.

11. The system of claim 10, wherein the optical fiber sensors are multiplexed along a single optical pathway.

12. The system of claim 11, wherein the optical fiber sensors comprise coils of optical fiber.

13. The system of claim 12, wherein the coils are elongated along a line parallel to the central axis of the casing and equally spaced around the exterior circumference of the casing.

14. The system of claim 12, wherein the coils are wrapped around the exterior circumference and concentric with the central axis of the casing.

15. The system of claim 12, wherein the coils are each bounded by a pair of fiber Bragg gratings.

16. The system of claim 12, further comprising a fiber Bragg grating between each of the coils.

17. The system of claim 11, wherein the optical fiber sensors comprise fiber Bragg gratings.

* * * * *